United States Patent [19]

Owen et al.

[11] Patent Number: 4,706,228

[45] Date of Patent: * Nov. 10, 1987

[54] ASYMMETRICAL LATERAL-FORCE SEISMIC SOURCE TRANSDUCER

[75] Inventors: Thomas E. Owen; Edgar C. Schroeder, both of San Antonio, Tex.

[73] Assignee: Southwest Research Institute, San Antonio, Tex.

[*] Notice: The portion of the term of this patent subsequent to Mar. 17, 2004 has been disclaimed.

[21] Appl. No.: 915,146

[22] Filed: Oct. 3, 1986

Related U.S. Application Data

[63] Continuation-in-part of Ser. No. 678,290, Dec. 5, 1984, Pat. No. 4,651,311.

[51] Int. Cl.$^4$ .............................................. G01V 1/40
[52] U.S. Cl. .................................... 367/147; 181/104; 181/106; 181/401; 367/151
[58] Field of Search ............... 181/102, 103, 104, 105, 181/106, 108, 110, 113, 116, 117, 118, 119, 120, 400, 401, 402, 139; 367/140, 141, 142, 144, 145, 146, 147, 151, 189, 190, 911, 912

[56] References Cited

U.S. PATENT DOCUMENTS

| | | | |
|---|---|---|---|
| 3,221,833 | 12/1965 | Malmberg | 181/106 |
| 3,403,375 | 9/1968 | Wright, Jr. et al. | 367/147 |
| 3,428,940 | 2/1969 | Huckabay | 367/147 |
| 3,458,858 | 7/1969 | Wright | 367/147 |
| 3,718,205 | 2/1973 | Fair et al. | 181/106 X |
| 3,740,708 | 6/1973 | Phillips | 367/147 |
| 3,991,850 | 11/1976 | Escaron | 181/102 |
| 4,039,042 | 8/1977 | Edwards et al. | 367/147 |
| 4,651,311 | 3/1987 | Owen et al. | 367/147 |

OTHER PUBLICATIONS

H. A. Wright, Jr., The Electrodeless Spark Underwater Sound Source, Jan. 8, 1970, entire report is pertinent, especially pp. 17-23.

*Primary Examiner*—Deborah L. Kyle
*Assistant Examiner*—Brian S. Steinberger
*Attorney, Agent, or Firm*—Richard J. Smith

[57] ABSTRACT

A spark discharge acoustic pulse transducer for borehole operation provides an insulating ceramic barrier which contains a small cross-section aperture separating two bodies of electrolyte through which the two zones of liquid make contact. An electrical arc discharge is caused to occur through the aperture to produce a transient pressure pulse and associated acoustic pulse which is coupled to the geologic formation at the borehole wall. The specific shape and geometry of the aperture channel in the insulating barrier being exponentially shaped provides a means for controlling the waveform and frequency spectrum of the acoustic pulse. The transducer has an elastic outer housing and an elastic inner housing with hydraulic fluid between the inner and outer housings. The pressure of the hydraulic fluid may be increased to expand the outer housing against a borehold prior to a spark discharge. The transducer is also provided with a system for venting gas produced as a result of the spark discharge. The transducer is designed to produce asymmetrical forces on the borehole wall in the azimuthal plane about the discharge chamber axis.

10 Claims, 7 Drawing Figures

ASYMMETRICAL LATERAL-FORCE SEISMIC SOURCE TRANSDUCER

BACKGROUND OF THE INVENTION

The present application is a continuation-in-part of U.S. patent application Ser. No. 678,290, filed Dec. 5, 1984, now U.S. Pat. No. 4,651,311 issued Mar. 17, 1987, entitled AN ELECTRODELESS SPARK DISCHARGE ACOUSTIC PULSE TRANSDUCER FOR BOREHOLE OPERATION.

The present invention relates to an electrodeless spark discharge acoustic source transducer for borehole operations which produces asymmetrical forces in the azimuthal plane about the discharge chamber axis.

Spark discharge devices have been employed in the prior art to generate acoustic pulse signals in liquid media such as seawater for the purpose of conducting bathymetric surveys of the ocean and subbottom profiles of marine sediments. In these applications, the metallic spark discharge electrodes are immersed directly in the salt water electrolyte with the result that the repetitive plasma discharge erodes the electrodes to change their geometric shape and spacing. The spark discharge occurring in such open water environments is also subject to possible spatial variations in the electrolytic parameters of the liquid medium. Electrode geometry, spacing, and electrolyte parameters affect the electro-acoustic energy conversion process associated with the electric spark discharge, including the accuracy and stability of the timing between the spark-initiating trigger and the resulting acoustic pressure pulse.

The use of open-electrode spark discharge devices in water-filled boreholes has been reported. However, since the fluid present in such boreholes is usually freshwater, which is only slightly conductive, salt must be added to the boreholes in order to obtain efficient electrical discharge operation. Even when such conditioning of the borehole fluid is performed, the spark discharge process is still subject to the same variables mentioned in connection with the spark discharges operating in open seawater. Moreover, while acoustic pulse signals generated by spark discharge techniques can potentially provide a useful and efficient means of probing the geologic materials from boreholes, many drill holes are unable to hold water because of geologic fractures or because of their horizontal orientation.

U.S. Pat. No. 3,428,940 issued to Huckabay discloses a sonic transmitter having a housing containing a chamber separated from the water or other medium through which sound is to be transmitted. A liquid metal is momentarily converted to a gas at the point of vaporization to expand an elastic housing wall and generate a sonic wave in the surrouding water or other medium.

SUMMARY OF THE INVENTION

The invention disclosed herein is an electrical discharge device whose electrodes are not subject to erosion by the plasma discharge process and which has a selfcontained liquid electrolyte whose parameters remain unchanged after many spark discharges. These features overcome the primary disadvantages noted for open electrode spark discharge devices. Further, the invention disclosed herein is designed to generate asymmetrical forces on a borehole wall, thereby exciting shear waves in the surrounding geologic medium as the predominant form of seismic radiation.

The lack of repetitive timing stability and repeatability of the acoustic waveforms found in the prior art have prevented their use in applications requiring repetitive signal averaging and other forms of advanced signal processing. The instant invention provides an insulating ceramic barrier which contains a small cross-section aperture separating two bodies of electrolyte through which the two zones of liquid make contact. The specific shape and geometry of the insulating barrier provides a means for controlling the waveform and frequency spectrum of the acoustic pulse.

The plasma arc produced by the discharge does not make contact with any erodible material and, therefore, the geometry and dimensions of the discharge zone which is determined by the ceramic barrier remains constant. The electrical discharge, resulting from electrical energy stored on a high-voltage capacitor, produces an extremely high temperature arc which rapidly vaporizes the liquid electrolyte contained in the small perforated section of the ceramic barrier to produce a thermodynamically-generated pressure pulse from which an acoustic pulse signal radiates. Since no erodible materials are in contact with the arc, the electrolyte properties remain uncontaminated and unchanged during many pulse discharge cycles.

In operation the application of a sufficiently high voltage across the filament of conductive liquid within the aperture causes the liquid to vaporize to produce a small steam bubble. The high-resistance steam bubble is unable to stand off the high voltage and arcing immediately occurs to produce a highly conductive path joining the two zones of liquid, thereby allowing the electric discharge current to continue through the aperture. The high temperature of the arc and the power dissipated in the liquid filament contained within the aperture continue to vaporize the electrolyte, converting input electrical energy into thermodynamic energy manifested largely as an expanding pressurized bubble. The expanding surface of this pressure zone launches a radiating shock pressure wave which propagates away from the localized electric discharge. By containing the volume of the electrolyte within an acoustically transparent chamber such as an elastomer tube, the radiated pressure wave will propagate into the medium surrounding the electrolyte chamber. A practical pulse repetition for this process is 0.5 pulses per second.

Another unique feature of the invention is that the size and shape of the liquid-filled aperture which electrically connects the two bodies of electrolytes is configured to determine the time dependence of the electrical energy discharge process. By making the aperture small in diameter and short in length, the discharge occurs rapidly. Alternatively, by making the aperture conical or exponential in shape and having a small vertex where the arc is initiated, the discharge is significantly extended in time. Since the time required for the stored electrical energy to dissipate in the discharge process governs the temporal characteristics of the radiated acoustic pressure wave, the aperture design of the invention provides a means for designing the pressure pulse waveform to be particularly applicable for borehole geophysical measurements.

The invention also provides additional advantages in being adaptable to cylindrical shapes for operation in boreholes and a means by which the spark discharge device can operate in boreholes which do not contain water or other fluids. The ability to contain the arc discharge process within a cylindrical elastomer tube makes the transducer uniquely adaptable to borehole geometry and operation. The electrodeless spark discharge arrangement eliminates the variations in arc geometry and, because of the absence of contaminants entering the self-contained electroltye fluid, the invention allows electrolyte parameters to remain unchanged during many discharge cycles. The invention additionally provides for a gas venting system sensitive to gas buildups which reduce the accuracy and repeatability in existing devices.

The venting system of the invention operates by sensing the electrical conductivity between the positive electrode and a gas vent electrode. The differential pressure required to expel any gas buildup is produced when hydraulic fluid is pumped into an annulus between an inner elastic housing and an outer elastic housing. The outer elastic housing is expanded outward against the borehole which results in an acoustically continuous fluid path from the spark discharge chamber to the borehole wall.

The invention is designed to generate asymmetrical forces on a borehole wall by means of one or more high density reaction masses which partially surround the transducer discharge chamber. By placing a high density mass on one side of the arc discharge chamber, a positive pressure is applied to the borehole wall in the preferred radiation direction and a minimal pressure is applied to the borehole wall in the direction of the reaction mass. By generating asymmetrical forces on the borehole wall, this new transducer will excite shear waves in the surrounding geologic medium as the predominant form of seismic radiation. Such asymmetrical forces will also tend to produce directionally radiated seismic waves, both shear waves and compressional waves, with respect to the direction of asymmetry.

DETAILED DESCRIPTION OF THE PREFERRED EMBODIMENT

Figure 1:
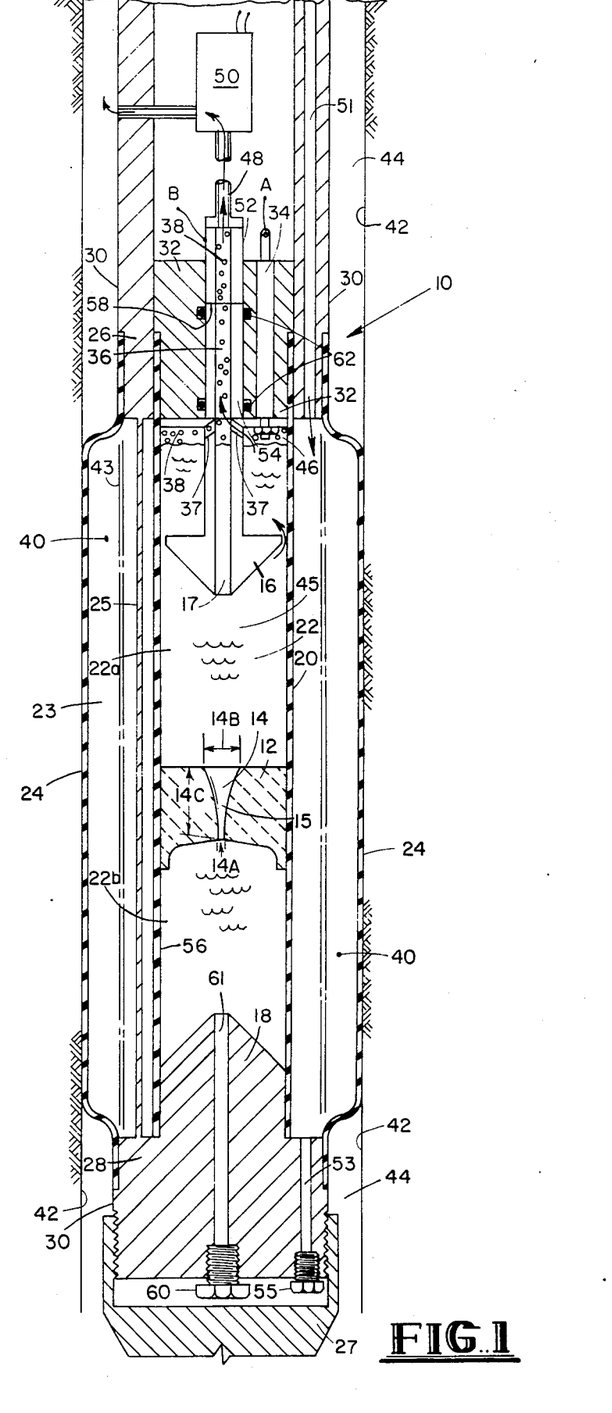
FIG. 1 is a cross-sectional view of the invention in its expanded condition within a borehole.

Referring to FIG. 1, the cylindrical electrical arc discharge transducer 10 consists of a ceramic barrier 12 with aperture 14, a positive electrode 16, and a negative electrode 18, in spaced relation from one another, enclosed in a rubber tube 20 filled with electrolyte 22. Rubber tube 20 is securely bonded at one end to a ceramic insulator 32 located within upper portion 26 of transducer 10 while the other end is securely bonded to lower portion 28 of transducer housing 30. Surrounding the electrolyte filled rubber tube 20 is an expandable rubber boot 24. One end of boot 24 is secured to upper portion 26 while the other end is secured to lower portion 28. In the annulus 23 between the rubber tube 20 and the expandable rubber boot 24 are four stainless steel support straps 25 which provide structural strength in tension between the upper 26 and lower 28 portions of the transducer housing 30. The straps are generally equally spaced apart in each quadrant of cylindrical annulus 23. The straps 25 also complete the electrical circuit from the negative electrode 18, which is an integral part of lower portion 28, to electrical ground (probe housing 30). A downhole end cap 27 is detachably connected to the lower portion 28 of the transducer housing 30 by suitable threaded means. End cap 27 functions to protect the end of the transducer during insertion into the borehole 44 and to protect fill/drain plugs 55 and 60.

The positive electrode 16 is attached to ceramic insulator 32 which isolates it electrically from the probe housing 30. Positive electrode 16 has a bore channel 17 to facilitate inspection of aperture 14 with a borescope without extensive disassembly of the entire transducer housing 30. Further, inspection of aperture 14 is also accomplished through channel 61 after removal of end cap 27 and plug 60.

High voltage is applied to the positive electrode 16 by an electrical feedthrough 34 which passes through the ceramic insulator 32. Also passing through the ceramic insulator 32 is gas vent channel 36 which is used to expel the gases 38 released from the electrolyte 22 by the spark discharge. Gas vent channel 36 has a teflon sleeve 54 extending therethrough as shown in FIG. 1. Seals 62 are installed between the sleeve 54 and insulator 32 to prevent a conductive film of electrolyte from forming in the interface between them.

The differential pressure required to expel the gas 38 is produced when hydraulic fluid is pumped into the annulus 23 between the rubber tube 20 and the expandable rubber boot 24. The hydraulic fluid 40 expands the boot 24 outward against the borehole wall 42 resulting in an acoustically continuous fluid path from the spark discharge chamber 45 to the borehole wall 42. The hydraulic fluid pressure also raises the static pressure of the electrolyte 22 above the pressure in the borehole 44. The gas 38 which collects at the top 46 of the electrolyte chamber 45 can be vented out through gas vent ports 37 in electrode 16, through gas vent channel 36, via sleeve 54, gas vent electrode 52, tube 48, and solenoid valve 50 shown in FIG. 1. In an alternate embodiment of the invention without the hydraulic fluid being pressurized, the gas naturally goes to the top 46 of electrolyte chamber 45 and when sufficient quantity of gas has accumulated, it can then be vented out through gas vent ports 37 in electrode 16, through gas vent channel 36, via sleeve 54, gas vent electrode 52, tube 48, and solenoid valve 50.

Hydraulic fluid pressure is developed in annulus 23 by pumping additional hydraulic fluid through fluid channel 51 into annulus 23. The pumping system is located above the transducer 10 and is not shown in FIG. 1. Transducer housing 30 also has a hydraulic fluid fill/discharge channel 53 with plug 55 in lower end portion 28 for conveniently filling or discharging hydraulic fluid from annulus 23.

Figure 2:
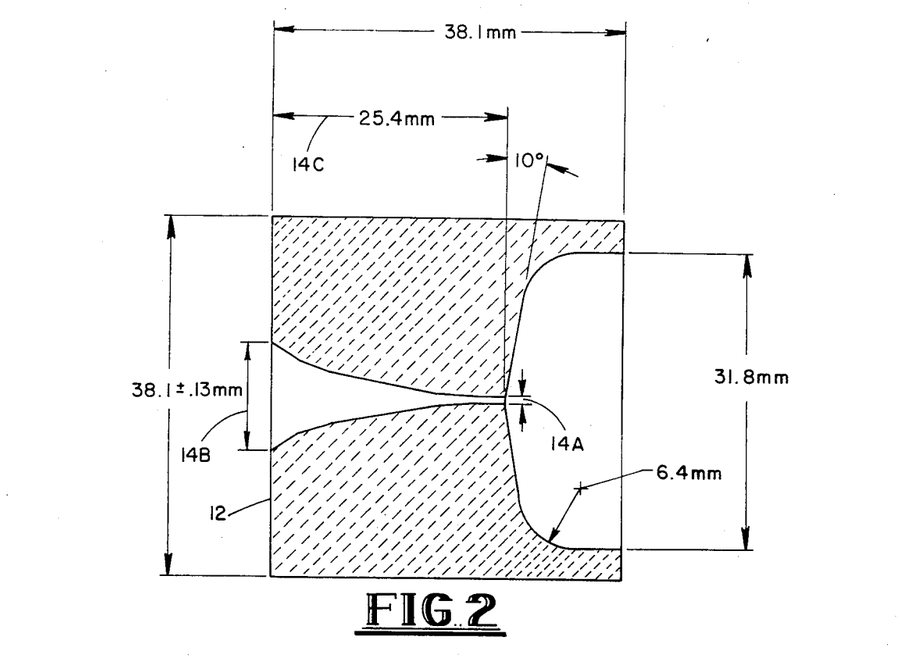
FIG. 2 is an enlarged cross-sectional view of the barrier of the invention.
Figure 3:
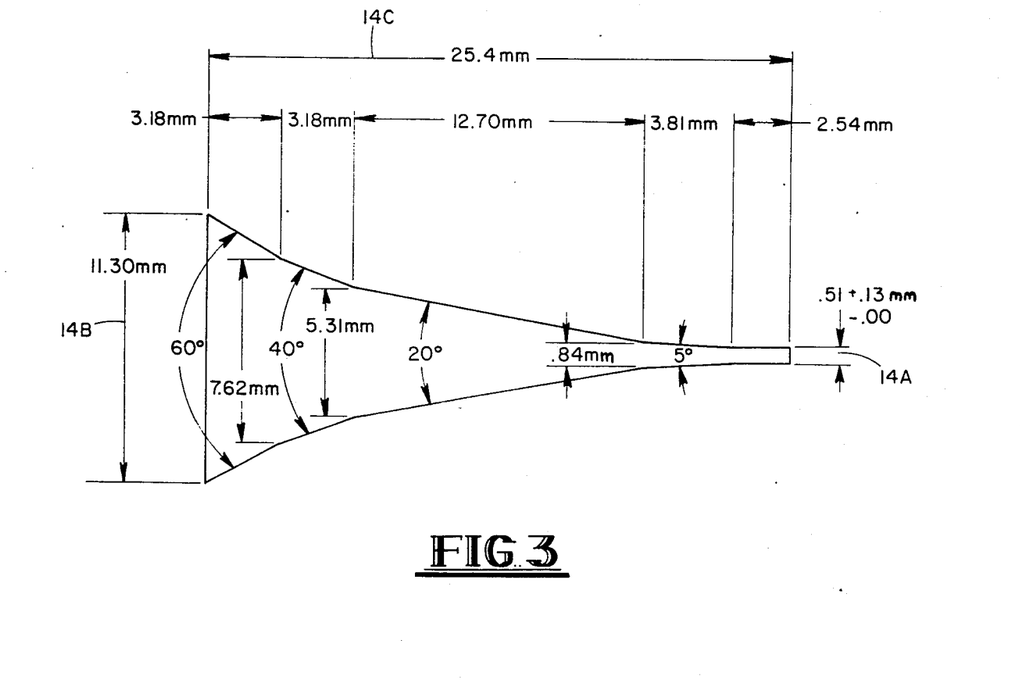
FIG. 3 is a detailed plan showing dimensions of the orifice of the barrier.

The insulating ceramic barrier 12 separates two bodies of electrolyte 22a and 22b. FIGS. 2 and 3 disclose more details about barrier 12. The barrier 12 contains a small cross-section aperture 14 through which the two zones of liquid make contact. The geometry of the aperture in the preferred embodiment is generally exponentially shaped with the diameter of the throat opening 14A being approximately $5.0 \times 10^{-4}$ meters and the diameter of the exit opening 14B being approximately $1.0 \times 10^{-2}$ meters. The length 14C of aperture 14 is approximately $2.5 \times 10^{-2}$ meters.

The electrolyte solution used in the preferred embodiment is a 17.5% by weight sodium sulfate solution. The sodium sulfate solution has been found to yield less gassing over repeated discharges. Other electrolytes which may be utilized include 20% by weight solutions of sodium chloride, or potassium chloride, or aluminum chloride.

In operation, a sufficiently high voltage (approximately 10,000 volts) applied via the bulk electrolyte bodies 22a and 22b across the filament of conductive liquid 15 within aperture 14 causes the liquid to vaporize because of electrical heating to produce a small steam bubble at the small diameter 14A. The high resistance steam bubble is unable to stand off the high voltage and arcing immediately occurs to produce a highly conductive path joining the two zones of liquid, thereby allowing the electric discharge current to continue through aperture 14. The high temperature of the arc and the power dissipated in electrolyte filament 15 contained within aperture 14 continue to vaporize the electrolyte 22, converting the input electrical energy into thermodynamic energy manifested largely as an expanding pressurized bubble. The expanding surface of this pressure zone launches a radiating shock pressure wave which propagates away from the localized electric discharge. By containing the volume of the electrolyte 22 within acoustically transparent chamber 45, by means of inner rubber tube 20, the radiated pressure wave will propagate into the medium (hydraulic fluid 40) surrounding the electrolyte chamber 45, and eventually to borehole wall 42. A practical pulse repetition for this process is 0.5 pulses per second.

Ceramic barrier 12 is securely affixed by suitable means such as bonding to the inner wall 56 of the cylindrical inner rubber tube 20 between positive electrode 16 and negative electrode 18. Ceramic barrier 12 is designed such that the frequency spectrum of the radiated seismic pulse is matched to requirements for relatively long range seismic progation. In particular, the borehole transducer housing 30 must generate a relatively long time duration discharge pulse to produce the desired seismic signal frequency spectrum.

The aperture channel 14 which connects each region of bulk liquid electrolyte 22a and 22b forms the initial arc zone in the process of the electrical discharge pulse. As the pulse discharge progresses with time, the arc zone is enlarged by electrolyte vaporization and pressure expansion of the arc zone. The electrical resistance of the aperture channel 14 determines the energy density developed in the electrolyte 15 and 22 and, hence, the rate of vaporization. The aperture geometry not only controls the rate of vaporization but also controls the time duration of the pressure pulse generated in electrolyte filament 15 and therefore influences the frequency spectrum of the radiated acoustic pulse.

The resistance of the exponentially flare shaped aperture 14 of the instant invention exhibits a resistance that is much greater than that of conically flared apertures having the same throat 14a and exit 14b orifice diameters.

A numerical example of the invention consists of a 500 joule energy storage level and a discharge time constant which limits the radiated seismic frequency spectrum to the decade range of 100–1000 Hz. The peak energy of the electric discharge pulse occurs at an elapsed time of approximately 160 microseconds after initiating the discharge and the energy discharge event is essentially complete after 425 microseconds. Of the initial 500 joules of stored electrical energy released in the spark discharge, approximately 85 joules is dissipated in vaporizing the liquid electrolyte which produces a steam bubble in the liquid electrolyte at 14a. The expansion velocity of this bubble is a relatively insensitive function of the energy dissipation rate in the electrolyte. Because of charging current efficiency factors, when the transducer is operated at a repetition rate of 0.5 pulse discharge per second, the source transducer will require an average downhole operating power of 500 watts.

The transducer device 10 is relatively large in order to contain the necessary energy storage capacitor and the probe construction is compatible with the relatively high voltage required for efficient spark discharge operation (10,000 volts). The dimensional scale of the electrolyte chamber 45 in the invention are 2 inches in diameter and 8 inches in length. The entire downhole transducer is in the range of 15–20 feet in length in order to contain the energy storage capacitor (not shown) and other operating functions including the fluid reservoir and pump necessary for operating the fluid coupling expansion boot 24 to facilitate operation of the transducer 10 in fluid-free boreholes.

The need for venting gas 38 in the invention is determined electronically by sensing the conductivity between the positive electrode 16 and the gas vent electrode 52. As is shown in FIG. 1, the outer expandable rubber boot 24 has been expanded out against borehole wall 42 by hydraulic fluid 40 under pressure, and the transducer 10 has been in operation long enough for a small amount of gas 38 to collect at the top 46 of the electrolyte chamber 45. This gas 38 is shown in the process of venting out through the solenoid valve 50 and into the borehole 44.

At the beginning of a normal sequence of operation, the solenoid valve 50 is closed; the outer expandable rubber boot 24 is in the retracted position (as shown by dotted lines 43 in FIG. 1); and the electrolyte 22 level when the chamber 45 is filled, is at or above the sensing level defined by the interface 58 between the teflon sleeve 54 and the level sensing metal electrode (gas vent electrode) 52. With the electrolyte 22 contacting the level sensing electrode 52, the electrical resistance between "A" and "B" is low. This low resistance is detected by an electronic control circuit (not shown) which keeps the solenoid valve 50 closed.

During the normal sequence of operation the outer expandable boot 24 is expanded against borehole wall 42 by hydraulic fluid 40 under pressure. This outward expansion of outer boot 24 also places the electrolyte 22 under pressure since the inner rubber tube 20 is flexible. The transducer 10 is operated by applying a high voltage source between point "A" and the probe housing 30. The result is an electric arc and vapor bubble formation at the aperture vertex 14A in the ceramic barrier 12.

The portion of the resulting gas 38 which does not go back into solution with the electrolyte 22 rises to the top 46 of the chamber 45 and accumulates as shown in FIG. 1. After a predetermined number of spark discharges, the electronic control circuit checks the resistance between point "A" and "B". If the electrolyte 22 is not contacting the level sensing or gas vent electrode 52 due to the accumulated gas 38, the resistance is high; and the control circuit opens solenoid valve 50. The teflon sleeve 54 provides a non-wetting surface which prevents the accumulation of a conductive film of electrolyte 22 on the inner surface of the channel 36. Since the electrolyte 2 and gas 38 are under pressure from the hydraulic fluid 40, the gas 38 is quickly vented through gas vent ports 37, gas vent channel 36, tube 48, and solenoid valve 50 into the borehole 44.

When the gas 38 has been vented and the electrolyte 22 again contacts the level sensing or gas vent electrode 52, the control circuit closes solenoid 50. This compeltes the venting sequence.

Even though a large amount of gas 38 may be vented over a period of time, the electrolyte 22 is not greatly depleted since small liquid volumes are converted into relatively large gas volumes. Eventually the wall of inner rubber tube 20 will be squeezed inward slightly. However, the addition of electrolyte 22 via plug 60 through channel 61 into chamber 45 during the next maintenance procedure brings the wall of inner tube 20 back to normal position.

A large coil of plastic or nylon tubing 48 exists between the level sensing/gas vent electrode 52 and solenoid valve 50. This provides a high electrical resistance path between the electrolyte 20 and the solenoid valve 50 which is in direct contact with the probe housing 30. Even if electrolyte 22 droplets accumulate in tube 48, the resistance remains sufficiently high so that normal operation is not affected. In normal practice, tube 48 will usually be filled with gas 38 or droplets or short sections of electrolyte 22 interspersed by gas 38.

The transducer 10 shown in FIG. 1 may be used to generate seismic compressional waves in drilled geologic formations. The generation of compressional waves results from the axi-symmetric geometrical design of the discharge chamber 45 and the fact that the resulting pressure pulse produced by the arc discharge radiates an accoustic pulse signal whose wavefront is uniform and omni-directional in the azimuthal plane about the axis of discharge chamber 45. That is, the lateral forces caused by the pressure pulse are uniform and symmetrical about the axis of transducer 10, thereby generating compressional waves in the surrounding geologic medium.

As illustrated in FIGS. 4–7, the present invention is designed to produce asymmetrical forces by the addition of one or more high density reaction masses, identified by the numerals 70, 70a, and 70b, which partially surround the discharge chamber 45. By placing a high density mass, such as 70, 70a, or 70b, on one side of the cylindrical arc discharge chamber 45, the coupling of the pressure wave from the arc discharge pulse into the geologic medium surrounding the electrolyte chamber 45 will be reduced in the azimuthal sector containing the mass. Mass 70, 70a, or 70b acts as a very high mechanical impedance which causes the pressure wave incident on the mass to reflect in the direction away from the mass so as to produce a stronger pressure wave radiation in the azimuthal sector of the chamber 45 which is not impeded by the mass. The added mass 70, 70a, or 70b may be referred to as a reaction mass since the force of the pressure pulse within the discharge chamber 45 is intensified in the direction away from the mass because of the pressure wave reflection. Mass 70, 70a, or 70b is a dense material (the denser the better), such as tungsten. However, mass 70, 70a, or 70b may also be lead or ceramic. The thickness of mass 70, 70a, or 70b is approximately one inch (1") but depends upon the material utilized for the mass, the borehole diameter, and the strength of the arc discharge.

Figure 4:
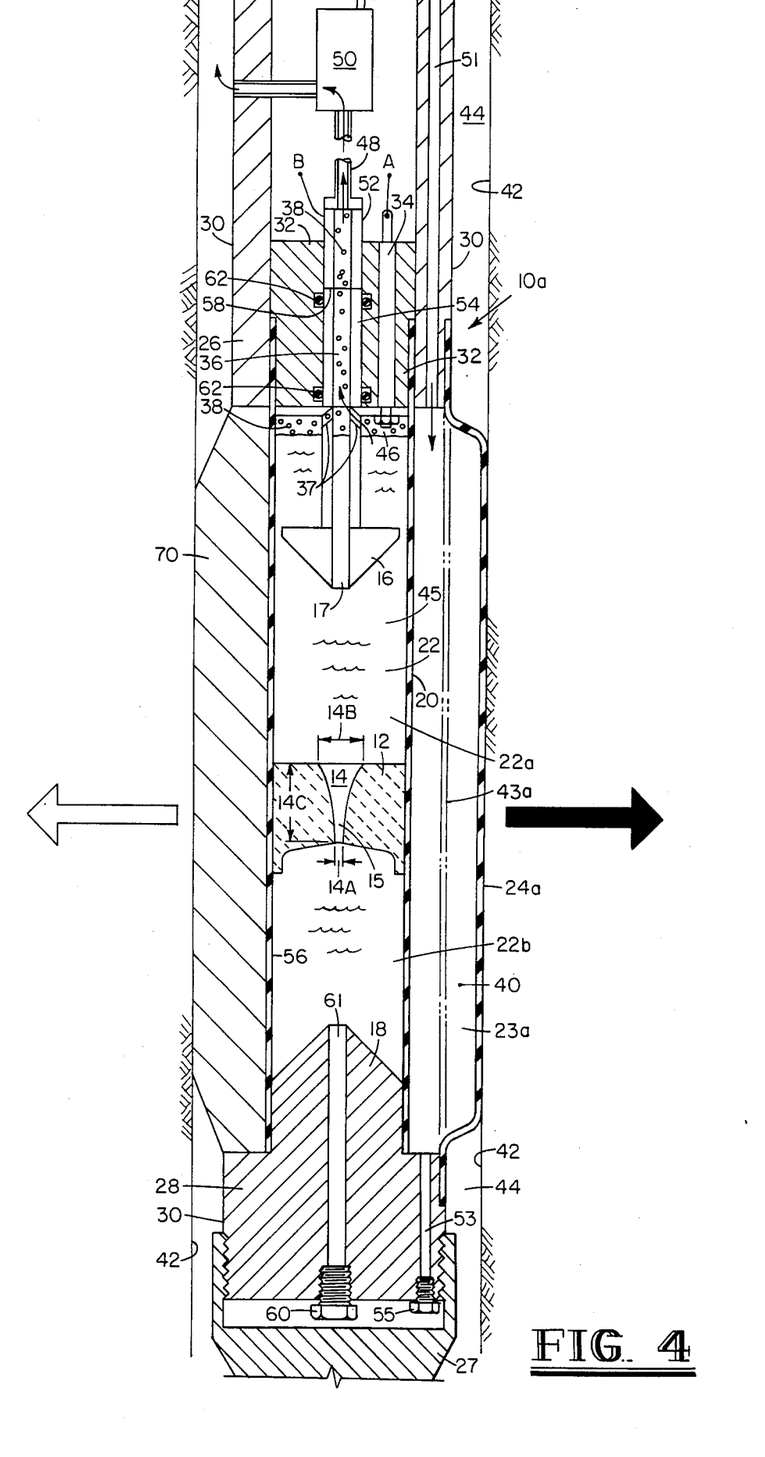
FIG. 4 is a cross-sectional view of the invention in its expanded condition within a borehole with a high density reaction mass surrounding one side of the discharge chamber.
Figure 5:
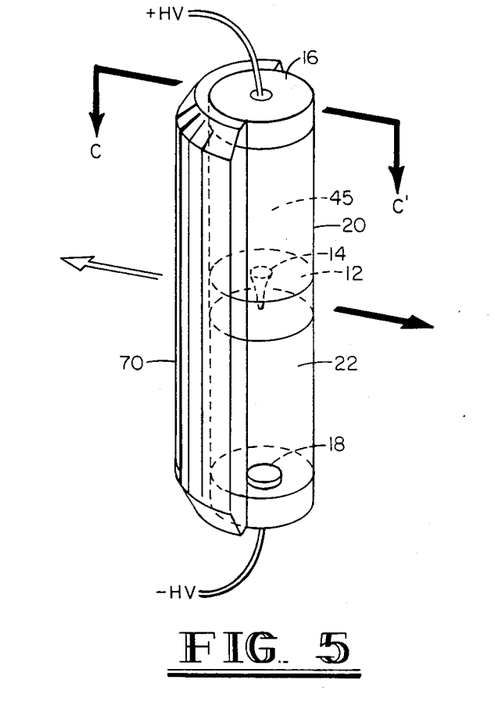
FIG. 5 is an illustrative perspective view of a portion of the invention shown in FIG. 4 illustrating the position of the high density reaction mass.

An asymmetrical force transducer 10a is illustrated in FIG. 4 and FIG. 5, with like numerals being utilized to identify components discussed hereinabove. FIG. 5 is illustrative of a portion of the invention shown in FIG. 4, with a number of components shown in FIG. 4 omitted in FIG. 5 for the sake of clarity. For further clarity, certain features of the invention are merely represented generally in FIG. 5. In the embodiment illustrated in FIG. 4 and FIG. 5, the chamber sleeve or tube 20 is surrounded on approximately one half of its circumference by an intimately fitted reaction mass 70. In the embodiment shown in FIG. 4 and FIG. 5, the mass 70 is intimately adjacent to sleeve 20 but is not attached to sleeve 20. The uphole end of mass 70 is welded or otherwise connected to upper portion 26 of housing 30. The downhole end of mass 70 is welded or otherwise connected to lower portion 28 of housing 30. Mass 70 also provides structural strength in tension between upper 26 and lower 28 portions of housing 30 and serves as a grounding path between electrode 18 and housing 30, thereby permitting elimination of straps 25. As further illustrated in FIG. 4 and FIG. 5, the uphole and downhole ends of mass 70 are appropriately tapered. As illustrated in FIG. 4, an outer expandable rubber boot 24a surrounds a portion of sleeve 20 and is appropriately secured on its uppermost end to upper portion 26 and on its lowermost end to lower portion 28. Boot 24a surrounds the portion of tube 20 not surrounded by mass 70. Further, the side edges of boot 24a are appropriately secured to mass 70. 23a represents the annulus between boot 24a and sleeve 20 and 43a represents the retracted position of boot 24a. Hydraulic fluid 40 is introduced to annulus 23a through fluid channel 51.

When the high voltage (HV) discharge energy source is applied via a switch (not shown), the liquid electrolyte 15 in the tapered aperture 14 vaporizes, the vapor bubble arcs over, and the discharge energy produces a plasma arc which expands to generate a pressure pulse that is transmitted through the electrolyte chamber sleeve 20 to launch acoustic or seismic waves in the surrounding media. The presence of the reaction mass 70 causes the pressure waves to be reflected and, hence, to radiate primarily in the direction not surrounded by the mass 70. This direction is illustrated in FIG. 4 and FIG. 5 by the shaded arrow and is the direction of preferred pressure wave radiation. The clear arrow in FIG. 4 and FIG. 5 illustrates the direction of reduced pressure wave radiation.

When the transducer assembly 10a is placed in a fluid filled borehole or otherwise coupled to a drilled geologic formation, as illustrated in FIG. 4, the lateral force on the borehole wall 42 is asymmetrical, a positive pressure being applied to the borehole wall 42 in the preferred radiation direction, illustrated by the shaded arrow, and a minimal pressure applied to the borehole wall 42 in the direction of the reaction mass 70, illustrated by the clear arrow. This laterally asymmetrical impulsive force induces dynamic shear stresses in the geologic medium which are oriented in a plane perpendicular to the borehole axis. The dynamic shear stress causes shear waves polarized transverse to the borehole axis to be radiated in the directions parallel to the borehole axis as well as in directions perpendicular to the direction of preferred pressure radiation. Thus, for vertically oriented boreholes, the asymmetrical force transducer 10a will launch shear waves in the drilled formation that propagate in the upward and downward directions from the source location as well as in all angular directions in the plane normal to plane C-C' indicated in FIG. 5. The particle motions of these shear waves are parallel to plane C-C'.

Figure 6:
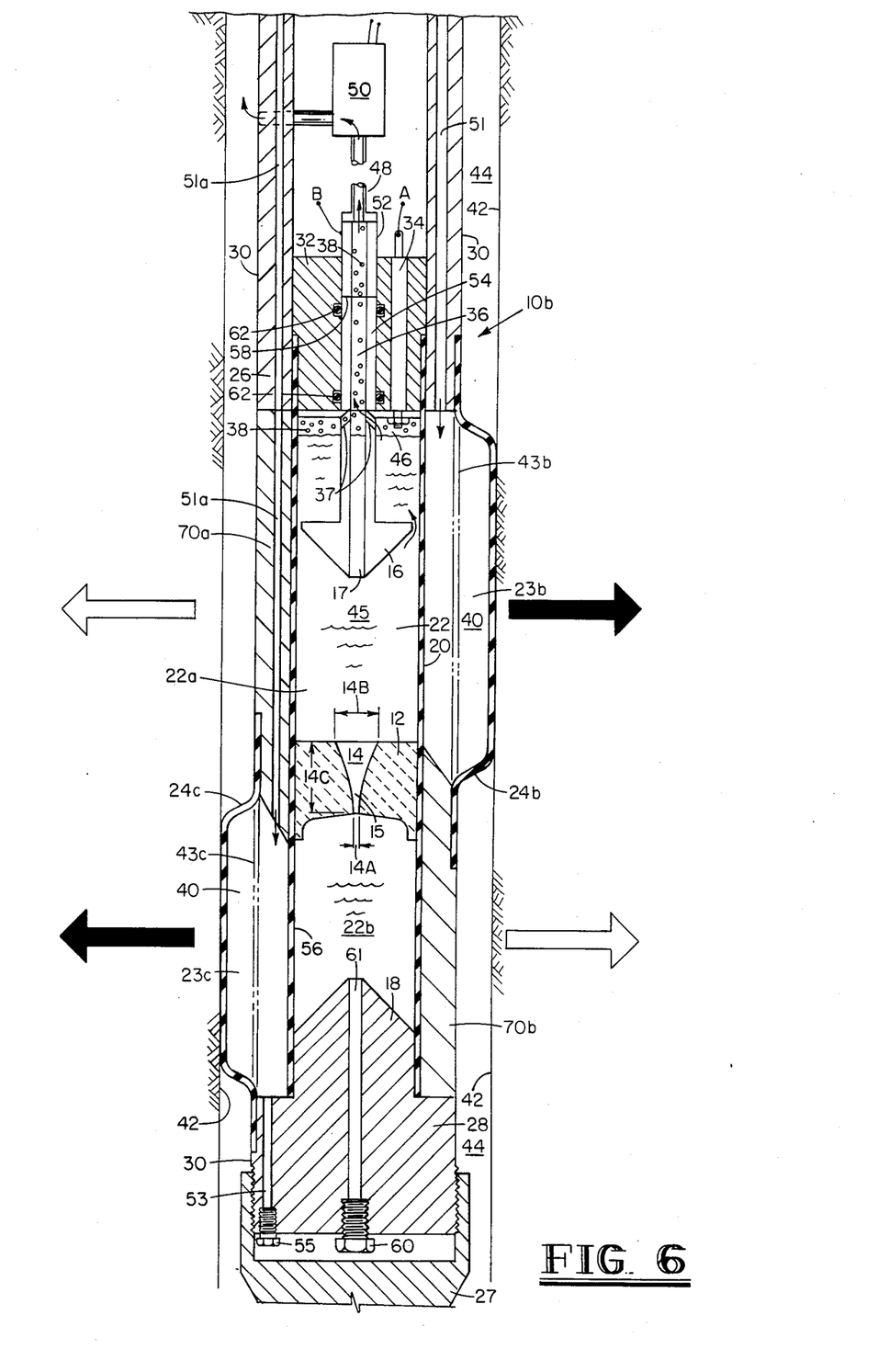
FIG. 6 is a cross-sectional view of the invention in its expanded condition within a borehole with a high density reaction mass surrounding an uphole portion of the discharge chamber on one side of the discharge chamber and another high density reaction mass surrounding a downhole portion of the discharge chamber on the opposite side of the discharge chamber.
Figure 7:
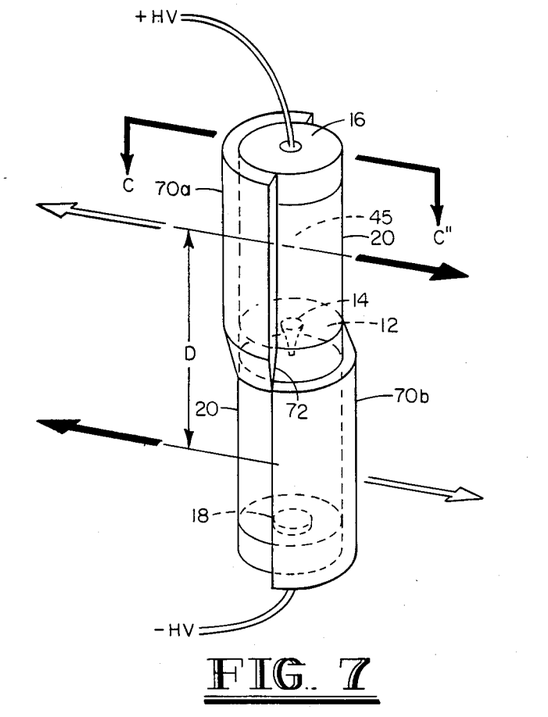
FIG. 7 is an illustrative perspective view of a portion of the invention shown in FIG. 6 illustrating the position of the high density reaction masses.

A second embodiment of an asymmetrical force transducer is illustrated in FIG. 6 and FIG. 7 and identified by the numeral 10b, with like numerals again being utilized to identify components discussed hereinabove. FIG. 7 is illustrative of a portion of the invention shown in FIG. 6, with a number of components shown in FIG. 6 omitted in FIG. 7 for the sake of clarity. For further clarity, certain features of the invention are merely represented generally in FIG. 7. In this embodiment, the upper (uphole) and lower (downhole) sections of the arc discharge chamber 45 are masked on diametrically opposite sides by reaction masses 70a and 70b, respectively, to produce an impulsive force couple oriented substantially transverse to the cylindrical axis of the transducer 10b. At the occurrence of each arc discharge, this force couple imposes an asymmetrical pressure wave excitation of the borehole wall 42 to generate shear waves polarized transverse to the borehole axis and having maximum particle motions in plane C-C'' illustrated in FIG. 7. The shaded arrows in FIGS. 6-7 illustrate the direction of preferred pressure wave radiation and the clear arrows in FIGS. 6-7 illustrate the direction of reduced pressure wave radiation.

Shear waves generated by the embodiment shown in FIG. 6 and FIG. 7 will tend to be in the frequency range for which the moment dimension of the force couple is equal to one-half the shear wavelength in the drilled geologic medium. This force couple dimension and frequency relationship is expressed in the following formula:

$$D = \tfrac{1}{2}\lambda_s = \tfrac{1}{2}\left(\frac{V_s}{f}\right)$$

wherein $\lambda_s$ is shear wavelength, $V_s$ is shear wave velocity, f is optimum frequency, and D is moment dimension, the distance or spacing illustrated in FIG. 7 between the center of pressure of the upper and lower ends of chamber 45. Excitation of arc discharge pressure pulse signals in the frequency range which will excite the optimum frequency shear waves is achieved by appropriate design of the arc discharge time constant. It is also to be understood that transducer 10a has no preferred frequency because it does not produce a force couple as transducer 10b does. However, the frequency characteristics of transducer 10a will be governed by the pulse discharge.

In the embodiment shown in FIG. 6 and FIG. 7, mass 70a is intimately adjacent to the uphole end of sleeve 20 and surrounds approximately one-half of the circumference of the uphole end of sleeve 20 but is not attached to sleeve 20. Mass 70b is intimately adjacent to the downhole end of sleeve 20 and surrounds approximately one-half of the circumference of the downhole end of sleeve 20 but is not attached to sleeve 20. The upper or uphole end of mass 70a is welded or otherwise connected to upper portion 26 of housing 30. The lower or downhole end of mass 70b is welded or otherwise connected to lower portion 28 of housing 30. The lower end of mass 70a and the upper end of mass 70b are preferably welded together or otherwise connected at each interface 72 on opposite sides of the chamber 45. The connection of mass 70a to mass 70b provides structural strength in tension between upper 26 and lower 28 portions of housing 30 and provides a continuous grounding path between electrode 18 and housing 30, thereby permitting elimination of straps 25. However, in the event masses 70a and 70b are not connected, appropriate grounding straps would be necessary.

As further illustrated in FIG. 6, an outer expandable rubber boot 24b is appropriately secured on its uppermost end to upper portion 26 and on its lowermost end to the uppermost end of mass 70b. Boot 24b surrounds the portion of the uphole end of sleeve 20 not surrounded by mass 70a. Further, the side edges of boot 24b are appropriately secured to mass 70a. 23b represents the annulus between boot 24b and sleeve 20 and 43b represents the retracted position of boot 24b. Hydraulic fluid 40 is introduced to annulus 23b through fluid channel 51. An outer expandable rubber boot 24c is appropriately secured on its uppermost end to the lowermost end of mass 70a and on its lowermost end to lower portion 28. Boot 24c surrounds the portion of the downhole end of sleeve 20 not surrounded by mass 70b. Further, the side edges of boot 24c are appropriately secured to mass 70b. 23c represents the annulus between boot 24c and sleeve 20 and 43c represents the retracted position of boot 24c. A fluid channel or drill hole 51a extends through upper portion 26 and mass 70a for introducing hydraulic fluid 40 into annulus 23c. Alternately, a tube (not shown) may extend from the bottom of boot 24b through mass 70a and/or 70b into the top of boot 24c. Channel 53 and plug 55 are also positioned to permit access to annulus 23c for fill/discharge of hydraulic fluid 40.

The shear waves radiated by either embodiment of the mass-loaded arc discharge transducer, as shown in FIGS. 4-5 and FIGS. 6-7, will constitute a significant portion of the acoustic energy produced by the discharge. The frequency spectrum and waveform of the shear wave source signal is governed by the physical dimensions of the tapered aperture 14 in the ceramic insulating barrier 12. Typical total energy levels and other arc discharge parameters for transducers 10a and 10b are:

Primary Energy=500 Joules (stored on capacitor)
Energy Storage Capacitor=14 mfd
Capacitor Voltage=8,500 volts
Energy Discharge Rate=One Discharge every 2 seconds
Frequency Spectrum of Arc Discharge Pulse=10-2,000 Hz.

The transducer designs illustrated in FIGS. 4-5 and FIGS. 6-7 will also generate and launch compressional wave pulse signals in drilled geologic formations. Because the arc discharge pressure pulse does not generate a uniform force on the borehole wall 42 in the presence of the reaction mass 70, 70a, or 70b, the compressional wave excitation will be nonuniform in the radial direction surrounding the borehole. Therefore, there will be a tendency for the radiated compressional wave to have at least some degree of azimuthal directionality. This directivity is governed by the effective radiation aperture of the transducer as measured in wavelength units of the compressional wave generated. However, since the diameter of the borehole forms this effective aperture and is very likely to be small (typically about 0.1 wavelength, or less), the compressional wave directivity in the radial plane about the borehole axis is essentially omnidirectional. Nevertheless, when operating frequencies in the range of a few kilohertz or higher are applicable in the borehole seismic measurements, a directional effectiveness corresponding to a front-to-back radiation amplitude ratio of about 2-to-1 may be provided by the above described design and can be useful and effective in many borehole geophysical applications.

The asymmetrical lateral force generated by transducer 10a or 10b results in several unique shear wave and compressional wave seismic radiation effects in drilled geologic formations. It is to be understood that, except for the modifications or variations described hereinabove, transducers 10a and 10b are constructed and operate as described in connection with transducer 10. It is also to be understood that, although it is preferred that transducers 10, 10a, and 10b be provided with boots 24, 24a, and 24b/24c, respectively, it is not necessary to utilize boot apparatus in a fluid filled borehole. That is, the present invention may be designed without boots 24, 24a, or 24b/24c, or hydraulic fluid 40 and associated fill/discharge passages 51, 51a, or 53. However, when transducers 10, 10a, or 10b are provided with boots 24, 24a, or 24b/24c, respectively, the transducers 10, 10a, or 10b may be used in either a fluid filled or nonfluid filled borehole. It is also to be understood that transducers 10a and 10b are preferably provided with centering apparatus, such as bowspring centralizer apparatus, to keep the axis of the transducer substantially centered within the borehole. It is also to be understood that the density of the material utilized for mass 70, 70a, or 70b is preferably at least 7000 kilograms per cubic meter.

While the invention has been described in connection with the preferred embodiment, it is not intended to limit the invention to the particular forms set forth, but, on the contrary, it is intended to cover alternatives, modifications, and equivalents as may be included within the spirit and scope of the invention as defined by the appended claims.

I claim:

1. A borehole seismic impulse source transducer comprising:
   an elastic, electrically insulating sleeve attached to and extending from a downhole end member to an uphole end member, said sleeve, downhole end member, and uphole end member defining a chamber for receiving electrolyte fluid, said sleeve completely surrounding an intermediate portion of said transducer and forming a sidewall of said chamber;
   said chamber divided into an upper volume area and a lower volume area by an insulator having an aperture channel therein, whereby said upper and lower volume areas of said chamber are in fluid communication;
   first and second electrodes extending into said upper volume area and said lower volume area, respectively, and in spaced relation from one another;
   means for supplying voltage across said electrodes whereby an arc discharge may be produced through and in the vicinity of said aperture channel;
   means for intermittent venting of a gas build up produced as a result of a number of said arc discharges in said electrolyte fluid, said gas venting means having a means for sensing said gas build up within said chamber; and
   at least one reaction mass surrounding approximately one half of said chamber sidewall, said mass being adapted to reflect a pressure wave incident on said mass resulting from said arc discharge so as to produce an intensified pressure pulse within said chamber in a direction away from said mass, said transducer thereby being adapted to produce asymmetrical forces in a geologic medium surrounding said chamber.

2. The invention of claim 1 wherein said insulator aperture channel has a flared cross-sectional area beginning with a first diameter at a first end of said aperture channel and increasing to a second diameter at an opposite end, said second diameter being larger than said first diameter, said flared cross-sectional channel controlling the amount of said electrolyte contained within said channel; said amount of electrolyte within said channel effecting the rate of heating and vaporization of said electrolyte during said arc discharge thereby determining the time required for a sound pressure pulse generated by said arc discharge to reach a peak value after an initial application of said voltage across said electrodes.

3. The invention of claim 1 wherein said reaction mass extends from said downhole end member to said uphole end member on one side of said chamber.

4. The invention of claim 1 wherein said transducer comprises first and second reaction masses extending from said uphole member and said downhole member, respectively, on diametrically opposite sides of said sleeve.

5. The invention of claim 1 wherein said reaction mass is lead.

6. A borehole seismic impulse source transducer comprising:
   an elastic outer boot and an elastic, electrically insulating inner sleeve each attached to and extending from a downhole end member to an uphole end member, said sleeve, downhole end member, and uphole end member defining a chamber for receiving electrolyte fluid, said sleeve completely surrounding an intermediate portion of said transducer and forming a sidewall of said chamber, said boot surrounding approximately one half of said sidewall, said sidewall and boot defining a cavity therebetween for receiving hydraulic fluid,
   said chamber divided into an upper volume area and a lower volume area by an insulator having an aperture channel therein, whereby said upper end lower volume areas of said chamber are in fluid communication;
   first and second electrodes extending into said upper volume area and said lower volume area, respectively, and in spaced relation from one another;
   means for supplying voltage across said electrodes whereby an arc discharge may be produced through and in the vicinity of said aperture channel;
   means for intermittent venting of a gas build up produced as a result of a number of said arc discharges in said electrolyte fluid, said gas venting means having a means for sensing said gas build up within said chamber;

means for increasing pressure and volume of said hydraulic fluid for expanding said outer housing prior to said arc discharge and after said source transducer is positioned within a borehole; and a reaction mass surrounding approximately one half of said chamber sidewall on an opposite side of said sidewall from said boot, said mass being adapted to reflect a pressure wave incident on said mass resulting from said arc discharge so as to produce an intensified pressure pulse within said chamber in a direction away from said mass, said transducer thereby being adapted to produce asymmetrical forces in a geologic medium surrounding said chamber.

7. The invention of claim 6 wherein said insulator aperture channel has a flared cross-sectional area beginning with a first diameter at a first end of said aperture channel and increasing to a second diameter at an opposite end, said second diameter being larger than said first diameter, said flared cross-sectional channel controlling the amount of said electrolyte contained within said channel; said amount of electrolyte within said channel effecting the rate of heating and vaporization of said electrolyte during said arc discharge thereby determining the time required for a sound pressure pulse generated by said arc discharge to reach a peak value after an initial application of said voltage across said electrodes.

8. A borehole seismic impulse source transducer comprising:

an elastic, electrically insulating inner sleeve attached to and extending from a downhole end member to an uphole end member, said sleeve, downhole end member, and uphole end member defining a chamber for receiving electrolyte fluid, said sleeve completely surrounding an intermediate portion of said transducer and forming a sidewall of said chamber, said chamber divided into an upper volume area and a lower volume area by an insulator having an aperture channel therein, whereby said upper and lower volume areas of said chamber are in fluid communication;

a first and second electrode extending into said upper volume area and said lower volume area, respectively, and in spaced relation from one another;

means for supplying voltage across said electrodes whereby an arc discharge may be produced through and in the vicinity of said aperture channel;

a first elastic outer boot surrounding approximately one half of an uphole end of said sidewall, said sidewall and first boot defining a first cavity therebetween for receiving hydraulic fluid;

a second elastic outer boot surrounding approximately one half of a downhole end of said sidewall, said sidewall and second boot defining a second cavity therebetween for receiving hydraulic fluid;

a first reaction mass surrounding approximately one half of said uphole end of said sidewall on an opposite side of said sidewall from said first boot, said second boot attached to said downhole end member and a lowermost end of said first mass, said first mass being adapted to reflect a pressure wave incident on said first mass resulting from said arc discharge so as to produce an intensified pressure pulse within said chamber in a direction away from said first mass, said transducer thereby being adapted to produce asymmetrical forces in a geologic medium surrounding said chamber;

a second reaction mass surrounding approximately one half of said downhole end of said sidewall on an opposite side of said sidewall from said second boot, said first boot attached to said uphole end member and an uppermost end of said second mass, said second mass being adapted to reflect a pressure wave incident on said second mass resulting from said arc discharge so as to produce an intensified pressure pulse within said chamber in a direction away from said second mass, said transducer thereby being further adapted to produce asymmetrical forces in a geologic medium surrounding said chamber;

means for intermittent venting of a gas build up produced as a result of a number of said arc discharge in said electrolyte fluid, said gas venting means having a means for sensing said gas build up within said chamber; and means for increasing pressure and volume of said hydraulic fluid for expanding said first and second outer boots prior to said arc discharge and after said source transducer is positioned within a borehole.

9. The invention of claim 8 wherein said insulator aperture channel has a flared cross-sectional area beginning with a first diameter at a first end of said aperture channel and increasing to a second diameter at an opposite end, said second diameter being larger than said first diameter, said flared cross-sectional channel controlling the amount of said electrolyte contained within said channel; said amount of electrolyte within said channel effecting the rate of heating and vaporization of said electrolyte during said arc discharge thereby determining the time required for a second pressure pulse generated by said arc discharge to reach a peak value after an initial application of said voltage across said electrodes.

10. A borehole seismic impulse source transducer comprising:

an elastic, electrically insulating sleeve attached to and extending from a downhole end member to an uphole end member, said sleeve, downhole end member, and uphole end member, defining a chamber for receiving electrolyte fluid, said sleeve completely surrounding an intermediate portion of said transducer and forming a sidewall of said chamber, said chamber divided into an upper volume area and a lower volume area by an insulator having an aperture channel therein, whereby said upper and lower volume areas of said chamber are in fluid communication;

first and second electrodes extending into said upper volume area and said lower volume area, respectively, and in spaced relation from one another;

means for supplying voltage across said electrodes whereby an arc discharge may be produced through and in the vicinity of said aperture channel; and at least one reaction mass intimately adjacent to said chamber sidewall and surrounding approximately one half of said chamber sidewall, said mass being adapted to reflect a pressure wave incident on said mass resulting from said arc discharge so as to produce an intensified pressure pulse within said chamber in a direction away from said mass, said transducer thereby being adapted to produce asymmetrical forces in a geologic medium surrounding said chamber.

* * * * *